US011935465B2

(12) United States Patent
Roh

(10) Patent No.: US 11,935,465 B2
(45) Date of Patent: Mar. 19, 2024

(54) ORGANIC LIGHT EMITTING DIODE DISPLAY INCLUDING DATA DRIVER WHICH ALTERNATELY OUTPUTS FIRST DATA SIGNAL AND SECOND DATA SIGNAL

(71) Applicant: Samsung Display Co., Ltd., Yongin-si (KR)

(72) Inventor: Jae-Du Roh, Mokpo-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 47 days.

(21) Appl. No.: 17/385,832

(22) Filed: Jul. 26, 2021

(65) Prior Publication Data

US 2021/0358402 A1 Nov. 18, 2021

Related U.S. Application Data

(60) Continuation of application No. 15/911,056, filed on Mar. 2, 2018, now Pat. No. 11,074,853, which is a (Continued)

(30) Foreign Application Priority Data

Apr. 16, 2013 (KR) ........................ 10-2013-0041686

(51) Int. Cl.
*G09G 3/3208* (2016.01)

(52) U.S. Cl.
CPC ... *G09G 3/3208* (2013.01); *G09G 2300/0452* (2013.01); *G09G 2310/0297* (2013.01); *G09G 2320/0223* (2013.01)

(58) Field of Classification Search
CPC ......... G09G 3/3208; G09G 2310/0297; G09G 2320/0223; G09G 2300/0452
See application file for complete search history.

(56) References Cited

U.S. PATENT DOCUMENTS

2004/0130520 A1 7/2004 Maeda et al.
2006/0125738 A1 6/2006 Kim et al.
(Continued)

FOREIGN PATENT DOCUMENTS

CN 1776796 A 5/2006
CN 102568374 A 7/2012
(Continued)

OTHER PUBLICATIONS

Taiwanese Office Action dated Aug. 23, 2017 for Taiwanese Patent Application No. TW 103105350, which shares priority of Korean Patent Application No. KR 10-2013-0041686 with subject U.S. Appl. No. 14/061,634.
(Continued)

*Primary Examiner* — Kwang-Su Yang
(74) *Attorney, Agent, or Firm* — Lewis Roca Rothgerber Christie LLP

(57) ABSTRACT

An organic light emitting diode (OLED) display is disclosed. In one aspect the display includes a display panel having first through fourth pixels and a scan driving unit that outputs a scan signal to the display panel. The display also includes a data driving unit that alternately outputs a first data signal for the first pixels and a second data signal for the second pixels to the display panel, alternately outputs a third data signal for the third pixels and a fourth data signal for the fourth pixels to the display panel, and begins outputting the first and third data signals before one horizontal period begins The display further includes a demultiplexing unit that alternately applies the first and second data signals to the first and second pixels and the third and fourth data signals to the third and fourth pixels.

10 Claims, 10 Drawing Sheets

Related U.S. Application Data division of application No. 14/061,634, filed on Oct. 23, 2013, now Pat. No. 9,911,378.

(56) References Cited

U.S. PATENT DOCUMENTS

| | | | | |
|---|---|---|---|---|
| 2006/0151745 | A1 | 7/2006 | Kim et al. | |
| 2006/0267885 | A1 | 11/2006 | Kwak et al. | |
| 2008/0055304 | A1 | 3/2008 | Ryu et al. | |
| 2009/0213048 | A1 | 8/2009 | Park et al. | |
| 2009/0251455 | A1 | 10/2009 | Park et al. | |
| 2010/0141693 | A1 | 6/2010 | Lee et al. | |
| 2013/0141320 | A1 | 6/2013 | Kim | |
| 2014/0191931 | A1* | 7/2014 | Kim | G09G 3/3685 345/76 |
| 2014/0198135 | A1* | 7/2014 | Eom | G09G 3/3275 345/82 |

FOREIGN PATENT DOCUMENTS

| | | | |
|---|---|---|---|
| CN | 103137089 | A | 6/2013 |
| KR | 10-2005-0001741 | A | 1/2005 |
| KR | 10-2006-0117119 | A | 11/2006 |
| KR | 10-2009-0096999 | A | 9/2009 |
| TW | 200636664 | | 10/2006 |
| TW | 200710802 | | 3/2007 |
| TW | 200720802 | | 3/2007 |
| TW | 200905637 | | 2/2009 |

OTHER PUBLICATIONS

First Chinese Office Action dated Jul. 3, 2017 for Chinese Patent Application No. CN 201410058692.2, which shares priority of Korean Patent Application No. KR 10-2013-0041686 with subject U.S. Appl. No. 14/061,634.

* cited by examiner

ORGANIC LIGHT EMITTING DIODE DISPLAY INCLUDING DATA DRIVER WHICH ALTERNATELY OUTPUTS FIRST DATA SIGNAL AND SECOND DATA SIGNAL

CROSS-REFERENCE TO RELATED APPLICATIONS

This application is a continuation of U.S. patent application Ser. No. 15/911,056, filed Mar. 2, 2018, which is a divisional of U.S. patent application Ser. No. 14/061,634, filed Oct. 23, 2013, now U.S. Pat. No. 9,911,378, which claims priority under 35 USC § 119 to and the benefit of Korean Patent Application No. 10-2013-0041686, filed on Apr. 16, 2013 in the Korean Intellectual Property Office (KIPO), the contents of which are incorporated herein in its entirety by reference.

BACKGROUND

Field

The disclosed technology generally relates to a display device. More particularly, some embodiments of the inventive concept relate to an organic light emitting display device having a demultiplexing structure.

Description of the Related Technology

Recently, organic light emitting diode (OLED) displays are widely used as a flat panel display included in an electronic device because an OLED display has advantages of small size (i.e., thinner and lighter), low power consumption, high luminance, fast response speed, etc. Generally, in the OLED display, a plurality of pixels are connected to a plurality of data-lines for transmitting a data signal to the pixels, and to a plurality of scan-lines for transmitting a scan signal to the pixels. In addition, the pixels are arranged at locations corresponding to crossing points of the data-lines and the scan-lines. Thus, increasing a quantity of the pixels to increase a resolution of the OLED display may result in increasing a quantity of the data-lines and/or a quantity of the scan-lines. As a result, a manufacturing cost of the display may increase because a quantity of circuits included in a data driving unit that generates and outputs the data signal via the data-lines increases when a quantity of the data-lines increases.

To solve these problems, an OLED display having a demultiplexing structure has been suggested. Specifically, such a display may include a demultiplexing unit having a plurality of demultiplexers. Here, the demultiplexing unit may be placed between the display panel and the data driving unit in the OLED display. During one horizontal period (1H), the demultiplexers of the demultiplexing unit sequentially receive a plurality of data signals output from the data driving unit, and then selectively apply the data signals to the pixels according to colors of lights emitted by the pixels. For example, during one horizontal period (1H), the demultiplexers may sequentially receive a red color data signal (i.e., a data signal related to a red color light), a green color data signal (i.e., a data signal related to a green color light), and a blue color data signal (i.e., a data signal related to a blue color light). Then it may selectively apply the red color data signal, the green color data signal, and the blue color data signal to red color pixels (i.e., the pixels emitting the red color light), green color pixels (i.e., the pixels emitting the green color light), and blue color pixels (i.e., the pixels emitting the blue color light).

However, even when the OLED display has the demultiplexing structure, a quantity of the pixels may increase as the display resolution increases. One horizontal period (1H) of the OLED display may decrease when its resolution increases. As a result, a time during which respective source voltages corresponding to respective data signals sequentially output from the data driving unit during one horizontal time (1H) are changed. In particular, a time during which the source voltage corresponding to the red color data signal is changed and a time during which the source voltage corresponding to the blue color data signal is changed is usually at least 9 μs or longer. Therefore, when one horizontal period (1H) of the OLED display decreases, the source voltage corresponding to the red color data signal and the source voltage corresponding to the blue color data signal may not be sufficiently changed.

SUMMARY OF CERTAIN INVENTIVE ASPECTS

Some exemplary embodiments provide an organic light emitting display device having a demultiplexing structure capable of securing a sufficient time during which respective source voltages corresponding to respective data signals sequentially output from a data driving unit are changed.

According to some exemplary embodiments, an organic light emitting display device may include a display panel having first pixels emitting a first color light, second pixels emitting a second color light, third pixels emitting a third color light, and fourth pixels emitting a fourth color light. The first through fourth pixels are arranged at locations corresponding to crossing points of a plurality of scan-lines and a plurality of data-lines. A scan driving unit sequentially outputs a scan signal to the display panel. A data driving unit alternately outputs a first data signal for the first pixels and a second data signal for the second pixels to the display panel, that alternately outputs a third data signal for the third pixels and a fourth data signal for the fourth pixels to the display panel, and that begins outputting the first data signal and the third data signal before one horizontal period begins. A demultiplexing unit alternately applies the first data signal and the second data signal to the first pixels and the second pixels, respectively, and that alternately applies the third data signal and the fourth data signal to the third pixels and the fourth pixels, respectively. The demultiplexing unit being placed between the display panel and the data driving unit, and a timing control unit that controls the scan driving unit, the data driving unit, and the demultiplexing unit.

The display panel may be manufactured based on a WRGB-OLED technology.

The first color light may correspond to a blue color light, the second color light may correspond to a white color light, the third color light may correspond to a red color light, and the fourth color light may correspond to a green color light.

The demultiplexing unit may include first demultiplexers that apply the first data signal to the first pixels while the data driving unit outputs the first data signal, and that apply the second data signal to the second pixels while the data driving unit outputs the second data signal, and second demultiplexers that apply the third data signal to the third pixels while the data driving unit outputs the third data signal, and that apply the fourth data signal to the fourth pixels while the data driving unit outputs the fourth data signal.

Each of the first demultiplexers may include a first switch that controls a coupling between a first data-line connected to the first pixels and a first output-line of the data driving unit, and a second switch that controls a coupling between a second data-line connected to the second pixels and the first output-line of the data driving unit.

Each of the second demultiplexers may include a third switch that controls a coupling between a third data-line connected to the third pixels and a second output-line of the data driving unit, and a fourth switch that controls a coupling between a fourth data-line connected to the fourth pixels and the second output-line of the data driving unit.

The first and third switches may simultaneously turn-on or turn-off, and the second and fourth switches may simultaneously turn-on or turn-off.

The second and fourth switches may turn-off when the first and third switches turn-on, and the second and fourth switches may turn-on when the first and third switches turn-off.

According to some exemplary embodiments, an organic light emitting display device may include a display panel having first pixels emitting a first color light, second pixels emitting a second color light, and third pixels emitting a third color light, the first through third pixels being arranged at locations corresponding to crossing points of a plurality of scan-lines and a plurality of data-lines, a scan driving unit that sequentially outputs a scan signal to the display panel, a data driving unit that alternately outputs a first data signal for the first pixels, a second data signal for the second pixels, and a third data signal for the third pixels to the display panel, and that begins outputting the first data signal before one horizontal period begins, a demultiplexing unit that alternately applies the first data signal, the second data signal, and the third data signal to the first pixels, the second pixels, and the third pixels, respectively, the demultiplexing unit being placed between the display panel and the data driving unit, and a timing control unit that controls the scan driving unit, the data driving unit, and the demultiplexing unit.

The display panel may be manufactured based on an RGB-OLED technology

The first color light, the second color light, and the third color light may be selected among a blue color light, a red color light, and a green color light.

The demultiplexing unit may include demultiplexers that apply the first data signal to the first pixels while the data driving unit outputs the first data signal, that apply the second data signal to the second pixels while the data driving unit outputs the second data signal, and that apply the third data signal to the third pixels while the data driving unit outputs the third data signal.

Each of the demultiplexers may include a first switch that controls a coupling between a first data-line connected to the first pixels and an output-line of the data driving unit, a second switch that controls a coupling between a second data-line connected to the second pixels and the output-line of the data driving unit, and a third switch that controls a coupling between a third data-line connected to the third pixels and the output-line of the data driving unit.

The second and third switches may turn-off when the first switch turns-on, the first and third switches may turn-off when the second switch turns-on, and the first and second switches may turn-off when the third switch turns-on.

According to some exemplary embodiments, an organic light emitting display device may include a display panel having first pixels emitting a first color light, second pixels emitting a second color light, and third pixels emitting a third color light, the first through third pixels being arranged at locations corresponding to crossing points of a plurality of scan-lines and a plurality of data-lines, a scan driving unit that sequentially outputs a scan signal to the display panel, a data driving unit that alternately outputs a first data signal for the first pixels and a second data signal for the second pixels to the display panel, that outputs a third data signal for the third pixels to the display panel, and that begins outputting the first data signal before one horizontal period begins, a demultiplexing unit that alternately applies the first data signal and the second data signal to the first pixels and the second pixels, respectively, the demultiplexing unit being placed between the display panel and the data driving unit, and a timing control unit that controls the scan driving unit, the data driving unit, and the demultiplexing unit.

The display panel may be manufactured based on an RGB-OLED technology.

The first color light, the second color light, and the third color light may be selected among a blue color light, a red color light, and a green color light.

The data driving unit may begin outputting the third data signal before one horizontal period begins.

The demultiplexing unit may include demultiplexers that apply the first data signal to the first pixels while the data driving unit outputs the first data signal, and that apply the second data signal to the second pixels while the data driving unit outputs the second data signal.

Each of the demultiplexers may include a first switch that controls a coupling between a first data-line connected to the first pixels and an output-line of the data driving unit, and a second switch that controls a coupling between a second data-line connected to the second pixels and the output-line of the data driving unit.

The second switch may turn-off when the first switch turns-on, and the first switch may turn-off when the second switch turns-on.

Therefore, an organic light emitting display device having a demultiplexing structure according to example embodiments may secure a sufficient time during which respective source voltages corresponding to respective data signals are changed by controlling a data driving unit to begin outputting the respective data signals before one horizontal period begins.

BRIEF DESCRIPTION OF THE DRAWINGS

Illustrative, non-limiting example embodiments will be described in conjunction with the accompanying drawings.

DETAILED DESCRIPTION OF CERTAIN INVENTIVE EMBODIMENTS

Figure 1:
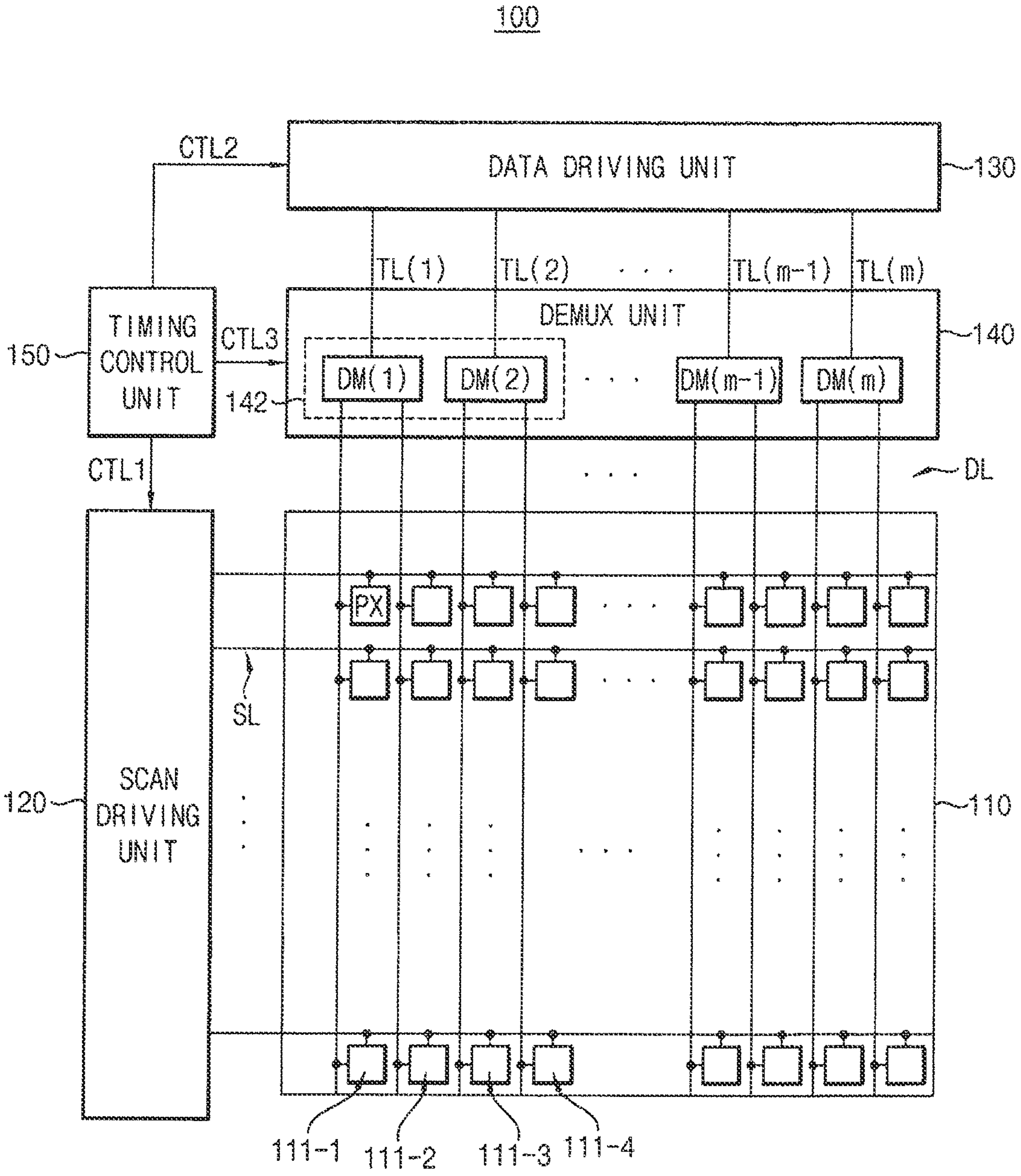
FIG. 1 is a block diagram illustrating an organic light emitting display device according to one exemplary embodiment.

Various embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing certain exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
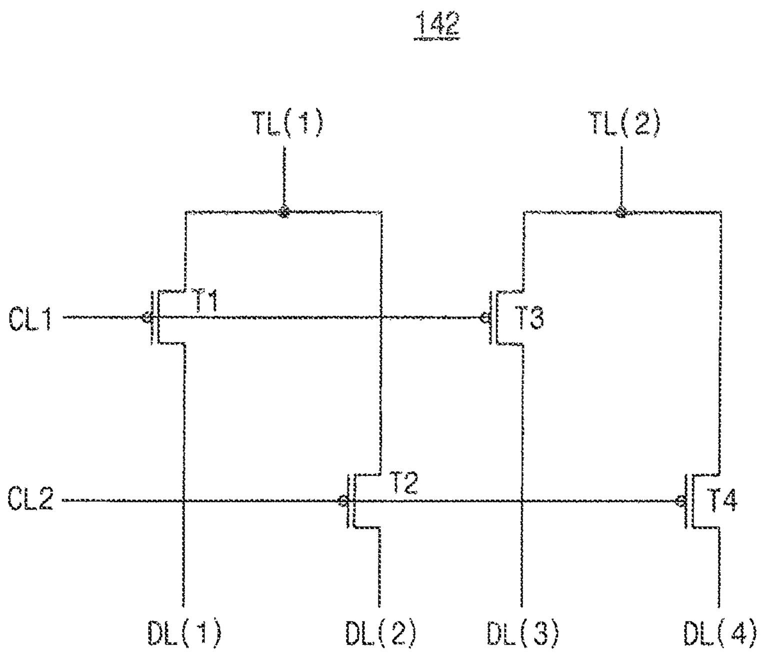
FIG. 2 is a diagram illustrating a group of demultiplexers included in a demultiplexing unit of an organic light emitting display device of FIG. 1.

FIG. 1 is a block diagram illustrating an organic light emitting diode (OLED) display according to one exemplary embodiment. FIG. 2 is a diagram illustrating a group of demultiplexers included in a demultiplexing unit of an organic light emitting display device of FIG. 1.

Referring to FIGS. 1 and 2, the OLED display 100 may include a display panel 110, a scan driving unit (or scan driver) 120, a data driving unit (or data driver) 130, a demultiplexing unit (or demultiplexer) 140, and a timing control unit (or timing controller) 150.

The display panel 110 may include first pixels 111-1 emitting first color light, second pixels 111-2 emitting second color light, third pixels 111-3 emitting third color light, and fourth pixels 111-4 emitting fourth color light. The first through fourth pixels 111-1 through 111-4 may be arranged at locations corresponding to crossing points of scan-lines SL and data-lines DL. Here, each of the first through fourth pixels 111-1 through 111-4 may be connected (hereinafter to be interchangeably used with "electrically connected") to one of the scan-lines SL and one of the data-lines DL, and thus may receive a scan signal transmitted via the scan-lines SL and a data signal transmitted via the data-lines DL. In one example embodiment, the display panel 110 may be manufactured based on a WRGB-OLED technology. For example, the first color light may correspond to a blue color light (B), the second color light may correspond to a white color light (W), the third color light may correspond to a red color light (R), and the fourth color light may correspond to a green color light (G). In other words, the first pixels 111-1 may be referred to as blue color pixels emitting the blue color light, the second pixels 111-2 may be referred to as white color pixels emitting the white color light, the third pixels 111-3 may be referred to as red color pixels emitting the red color light, and the fourth pixels 111-4 may be referred to as green color pixels emitting the green color light. Similarly, a first data signal that is applied to the first pixels 111-1 may be referred to as a blue color data signal, a second data signal that is applied to the second pixels 111-2 may be referred to as a white color data signal, a third data signal that is applied to the third pixels 111-3 may be referred to as a red color data signal, and a fourth data signal that is applied to the fourth pixels 111-4 may be referred to as a green color data signal. However, the present inventive concept is not limited thereto. To create the desired color, the first through fourth pixels 111-1 through 111-4 may be selected in various ways.

The scan driving unit 120 may sequentially output the scan signal to the display panel 110. For example, when the scan signal is output to a first scan-line SL, the first through fourth data signals may be applied to the first through fourth pixels 111-1 through 111-4 connected to the first scan-line SL, respectively. Similarly, when the scan signal is output to a second scan-line SL, the first through fourth data signals may be applied to the first through fourth pixels 111-1 through 111-4 connected to the second scan-line SL, respectively. Thus, when the scan driving unit 120 outputs the scan signal to a specific scan-line SL, the first pixels 111-1 connected to the specific scan-line SL may receive the first data signal, the second pixels 111-2 connected to the specific scan-line SL may receive the second data signal, the third pixels 111-3 connected to the specific scan-line SL may receive the third data signal, and the fourth pixels 111-4 connected to the specific scan-line SL may receive the fourth data signal. The data driving unit 130 may alternately output the first data signal for the first pixels 111-1 and the second data signal for the second pixels 111-2 to the display panel 110, and may alternately output the third data signal for the third pixels 111-3 and the fourth data signal for the fourth pixels 111-3 to the display panel 110. That is, the first data signal for the first pixels 111-1 and the second data signal for the second pixels 111-2 may be sequentially output during one horizontal period (1H), and the third data signal for the third pixels 111-3 and the fourth data signal for the fourth pixels 111-4 may be sequentially output during one horizontal period (1H).

As illustrated in FIG. 1, the OLED display 100 may have a demultiplexing structure. Thus, the demultiplexing unit 140 may be placed between the display panel 110 and the data driving unit 130, where the demultiplexing unit 140 includes a plurality of demultiplexers DM(1) through DM(m). The demultiplexing unit 140 may alternately receive the first data signal and the second data signal from the data driving unit 130, and may alternately apply the first data signal and the second data signal to the first pixels 111-1 and the second pixels 111-2. That is, the first data signal and the second data signal may be sequentially applied to the first pixels 111-1 and the second pixels 111-2, respectively during one horizontal period (1H). At the same time, the demultiplexing unit 140 may alternately receive the third data signal and the fourth data signal from the data driving unit 130, and may alternately apply the third data signal and the fourth data signal to the third pixels 111-3 and the fourth pixels 111-4. That is, the third data signal and the fourth data signal may be sequentially applied to the third pixels 111-3 and the fourth pixels 111-4, respectively during one horizontal period (1H). For example, a first demultiplexer DM(1) and a second demultiplexer DM(2) may operate as a group 142 of demultiplexers. In this case, as the data driving unit 130 alternately outputs the first data signal and the second data signal via a first output-line TL(1) (i.e., as the data driving unit 130 sequentially outputs the first data signal and the second data signal via the first output-line TL(1) during one horizontal period (1H)), the first demultiplexer DM(1) connected to the first output-line TL(1) may alternately apply the first data signal and the second data signal to the first pixels 111-1 and the second pixels 111-2. Similarly, as the data driving unit 130 alternately outputs the third data signal and the fourth data signal via a second output-line TL(2) (i.e., as the data driving unit 130 sequentially outputs the third data signal and the fourth data signal via the second output-line TL(2) during one horizontal period (1H)), the second demultiplexer DM(2) connected to the second output-line TL(2) may alternately apply the third data signal and the fourth data signal to the third pixels 111-3 and the fourth pixels 111-4.

For this operation, the demultiplexing unit 140 may include a plurality of first demultiplexers DM(1), DM(3), . . . , DM(m−1), and a plurality of second demultiplexers DM(2), DM(4), . . . , DM(m), where m is an integer equal to or greater than 2. The first demultiplexers DM(1), DM(3), . . . , DM(m−1) may apply the first data signal to the first pixels 111-1 while the data driving unit 130 outputs the first data signal, and may apply the second data signal to the second pixels 111-2 while the data driving unit 130 outputs the second data signal. The second demultiplexers DM(2), DM(4), . . . , DM(m) may apply the third data signal to the third pixels 111-3 while the data driving unit 130 outputs the third data signal, and may apply the fourth data signal to the fourth pixels 111-4 while the data driving unit 130 outputs the fourth data signal. In one example embodiment, as illustrated in FIG. 2, each of the first demultiplexers DM(1), DM(3), . . . , DM(m−1) may include a first switch T1 that controls a coupling between a first data-line DL(1) connected to the first pixels 111-1 and a first output-line TL(1) of the data driving unit 130, and a second switch T2 that controls a coupling between a second data-line DL(2) connected to the second pixels 111-2 and the first output-line TL(1) of the data driving unit 130. In addition, each of the second demultiplexers DM(2), DM(4), . . . , DM(m) may include a third switch T3 that controls a coupling between a third data-line DL(3) connected to the third pixels 111-3 and a second output-line TL(2) of the data driving unit 130, and a fourth switch T4 that controls a coupling between a fourth data-line DL(4) connected to the fourth pixels 111-4 and the second output-line TL(2) of the data driving unit 130.

The first switch T1 and the third switch T3 may be simultaneously or substantially simultaneously turned on or turned off based at least in part on a first demultiplexing control signal CL1, and the second switch T2 and the fourth switch T4 may be substantially simultaneously turned on or turned off based at least in part on a second demultiplexing control signal CL2. Here, the demultiplexing unit 140 may receive the first demultiplexing control signal CL1 and the second demultiplexing control signal CL2 from the timing control unit 150. For example, while the data driving unit 130 outputs the first data signal and the third data signal, the first demultiplexing control signal CL1 may have a logic low level to turn on the first switch T1 and the third switch T3. Thus, the first data signal and the third data signal may be applied to the first pixels 111-1 and the third pixels 111-3, respectively. In this case, the second demultiplexing control signal CL2 may have a logic high level to turn off the second switch T2 and the fourth switch T4. In addition, while the data driving unit 130 outputs the second data signal and the fourth data signal, the second demultiplexing control signal CL2 may have a logic low level to turn on the second switch T2 and the fourth switch T4. Thus, the second data signal and the fourth data signal may be applied to the second pixels 111-2 and the fourth pixels 111-4, respectively. In this case, the first demultiplexing control signal CL1 may have a logic high level to turn off the first switch T1 and the third switch T3. As described above, when the first and third switches T1 and T3 are turned on, the second and fourth switches T2 and T4 may be turned off. Similarly, when the second and fourth switches T2 and T4 are turned on, the first and third switches T1 and T3 may be turned off.

Since the OLED display 100 has the demultiplexing structure, the demultiplexing unit 140 may sequentially receive a plurality of data signals (i.e., the first and second data signals, and the third and fourth data signals) output from the data driving unit 130, and may selectively apply the data signals to the first through fourth pixels 111-1, 111-2, 111-3, and 111-4 according to colors of lights emitted by the first through fourth pixels 111-1, 111-2, 111-3, and 111-4 during one horizontal period (1H). However, when a quantity of the first through fourth pixels 111-1, 111-2, 111-3, and 111-4 increases as a resolution of the OLED display 100 increases, one horizontal period (1H) for the OLED display 100 may decrease because a quantity of the scan-lines SL increases. As a result, a time during which respective source voltages corresponding to respective data signals sequentially output from the data driving unit 130 during one horizontal time (1H) are changed may not be sufficiently secured. For example, a time during which respective source voltages corresponding to the first data signal (e.g., the blue color data signal) and the third data signal (e.g., the red color data signal) output from the data driving unit 130 are changed may not be sufficiently secured. The time during which the source voltage corresponding to the red color data signal is changed and a time during which the source voltage corresponding to the blue color data signal is changed is generally at least about 9.mu.s. Therefore, when one horizontal period (1H) of the OLED display 100 decreases, the source voltage corresponding to the red color data signal and the source voltage corresponding to the blue color data signal may not be sufficiently changed. To overcome this problem, the OLED display 100 may control the data driving unit 130 to begin outputting the first and third data signals before one horizontal period (1H) begins. As a result, compared to conventional OLED displays (not necessarily prior at) that control the data driving unit to begin outputting the first and third data signals after one horizontal period (1H) begins, the OLED display 100 may allow for a sufficient driving time during which respective source voltages corresponding to the first data signal and the third data signal output from the data driving unit 130 are changed.

The timing control unit 150 may control the scan driving unit 120, the data driving unit 130, and the demultiplexing unit 140. As illustrated in FIG. 1, the timing control unit 150 may generate a first control signal CTL1, a second control signal CTL2, and a third control signal CTL3, and may control the scan driving unit 120, the data driving unit 130, and the demultiplexing unit 140 by providing the first control signal CTL1, the second control signal CTL2, and the third control signal CTL3 to the scan driving unit 120, the data driving unit 130, and the demultiplexing unit 140. For example, the timing control unit 150 may provide the first control signal CTL1 to the scan driving unit 120. Thus, the scan driving unit 120 may sequentially output the scan signal to the display panel 110. In addition, the timing control unit 150 may provide the second control signal CTL2 to the data driving unit 130. Thus, the data driving unit 130 may alternately output the first data signal for the first pixels 111-1 and the second data signal for the second pixels 111-2 to the display panel 110, and may alternately output the third data signal for the third pixels 111-3 and the fourth data signal for the fourth pixels 111-4 to the display panel 110. For example, the timing control unit 150 may control the data driving unit 130 to begin outputting the first data signal and the third data signal before one horizontal period (1H) begins by providing the second control signal CTL2 to the data driving unit 130. Further, the timing control unit 150 may provide the third control signal CTL3 to the demultiplexing unit 140. Thus, the demultiplexing unit 140 may alternately apply the first data signal and the second data signal to the first pixels 111-1 and the second pixels 111-2, and may alternately apply the third data signal and the fourth data signal to the third pixels 111-3 and the fourth pixels 111-4. To this end, the third control signal CTL3 may include the first demultiplexing control signal CL1 and the second demultiplexing control signal CL2.

In brief, the OLED display 100 having the demultiplexing structure may allow for a sufficient driving time during which respective source voltages corresponding to respective data signals are changed by controlling the data driving unit 130 to begin outputting the data signals (e.g., the first data signal and the third data signal) before one horizontal period (1H) begins. On this basis, the OLED display 100 may display a high-quality image. Although it is illustrated in FIG. 2 that the first through fourth switches T1, T2, T3, and T4 are implemented by p-type metal-oxide semiconductor (PMOS) transistors, an implementation of the first through fourth switches T1, T2, T3, and T4 is not limited thereto. For example, the first through fourth switches T1, T2, T3, and T4 may be implemented by various transistors such as n-type metal-oxide semiconductor (NMOS) transistors, complementary metal-oxide semiconductor (CMOS) transistors, etc. In another embodiment, at least one of the switches T1-T4 can be a junction FET (JFET), a metal-semiconductor FET (MESFET), a modulation-doped FET (MODFET), a metal-oxide-semiconductor FET (MOSFET), an n-channel MOSFET (NMOSFET), a p-channel MOSFET (PMOSFET) and an organic FET (OFET). At least one of the switches T1-T4 may also include bipolar transistors. At least one of the switches T1-T4 may further include other switching devices such as digital or analog switches or a relay.

Figure 3:
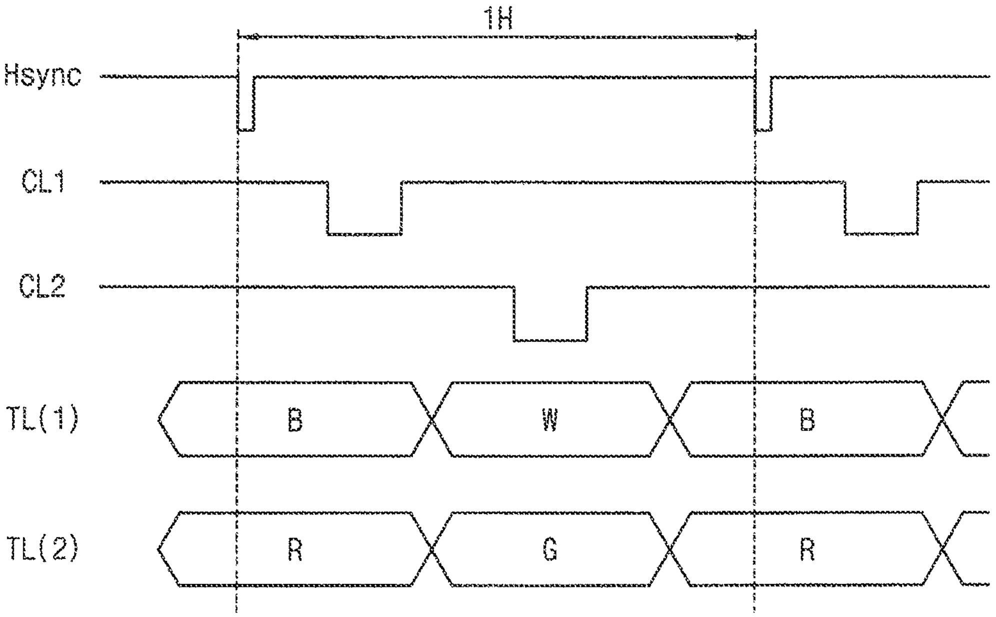
FIG. 3 is a timing diagram illustrating an example in which a data writing operation is performed in an organic light emitting display device of FIG. 1.
Figure 4A:
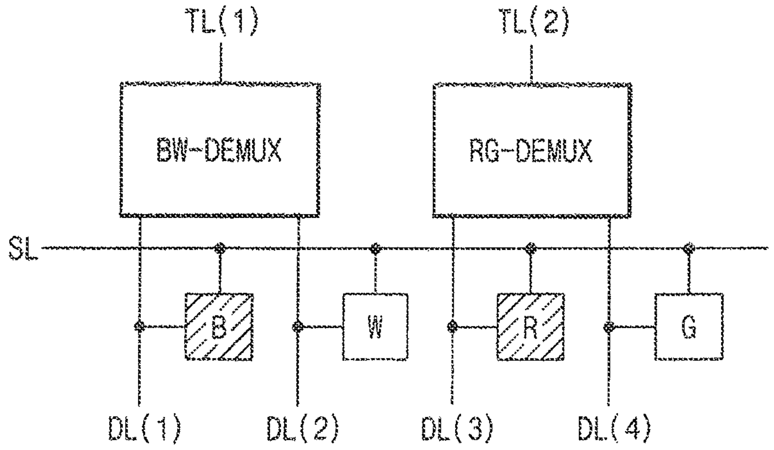
FIGS. 4A and 4B are diagrams illustrating an example in which a data writing operation is performed in an organic light emitting display device of FIG. 1.
Figure 4B:
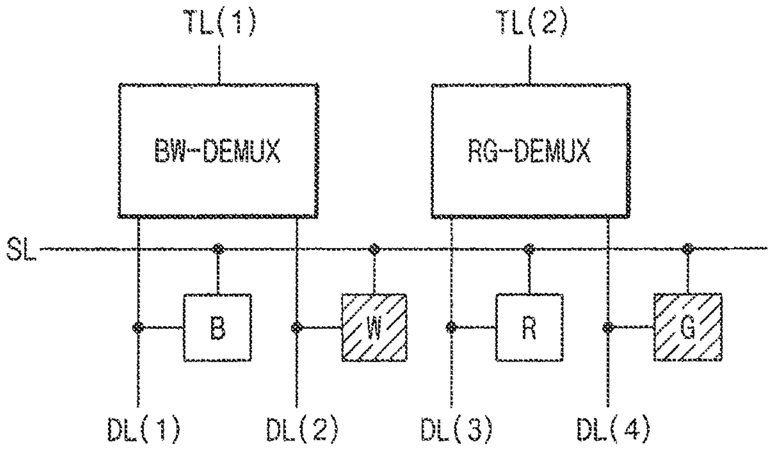

FIG. 3 is a timing diagram illustrating an example in which a data writing operation is performed in an OLED display of FIG. 1. FIGS. 4A and 4B are diagrams illustrating an example in which a data writing operation is performed in an OLED display of FIG. 1.

Referring to FIGS. 3, 4A, and 4B, one horizontal period (1H) for the OLED display 100 may be defined based on a horizontal synchronization signal Hsync. For convenience of descriptions, as described with reference to FIG. 2, a data writing operation will be described focused on a group 142 of demultiplexers including the first demultiplexer DM(1) and the second demultiplexer DM(2).

The data driving unit 130 may alternately output the first data signal B (e.g., the blue color data signal) and the second data signal W (e.g., the white color data signal) via the first output-line TL(1), and may alternately output the third data signal R (e.g., the red color data signal) and the fourth data signal G (e.g., the green color data signal) via the second output-line TL(2). As illustrated in FIG. 3, during one horizontal period (1H), the data driving unit 130 may sequentially provide the first data signal B and the second data signal W to the demultiplexing unit 140 via the first output-line TL(1), and may sequentially provide the third data signal R and the fourth data signal G to the demultiplexing unit 140 via the second output-line TL(2). That is, the demultiplexing unit 140 may substantially simultaneously receive the first data signal B and the third data signal R, and then may substantially simultaneously receive the second data signal W and the fourth data signal G. Thus, as illustrated in FIG. 4A, while the data driving unit 130 substantially simultaneously outputs the first data signal B and the third data signal R, the demultiplexing unit 140 may apply the first data signal B to the first pixels 111-1 via the first data-line DL(1), and may apply the third data signal R to the third pixels 111-3 via the third data-line DL(3) when the first demultiplexing control signal CL1 is changed from a logic high level to a logic low level. In addition, as illustrated in FIG. 4B, while the data driving unit 130 substantially simultaneously outputs the second data signal W and the fourth data signal G, the demultiplexing unit 140 may apply the second data signal W to the second pixels 111-2 via the second data-line DL(2), and may apply the fourth data signal G to the fourth pixels 111-4 via the fourth data-line DL(4) when the second demultiplexing control signal CL2 is changed from a logic high level to a logic low level.

When the data writing operation is performed in the OLED display 100, as illustrated in FIG. 3, the OLED display 100 may control the data driving unit 130 to begin outputting the first data signal B and the third data signal R before one horizontal period (1H) begins in order to secure a sufficient time during which respective source voltages corresponding to respective data signals (i.e., the first data signal B and the third data signal R) output from the data driving unit 130 are changed. Thus, the data driving unit 130 may begin outputting the first data signal B and the third data signal R before the horizontal synchronization signal Hsync is applied. As a result, compared to conventional OLED displays (not necessarily prior art) that control the data driving unit to begin outputting the first data signal B and the third data signal R after one horizontal period (1H) begins, the OLED display 100 may secure a sufficient time during which respective source voltages corresponding to respective data signals (i.e., the first data signal B and the third data signal R) are changed. Although it is described above that the first data signal B is the blue color data signal, the second data signal W is the white color data signal, the third data signal R is the red color data signal, and the fourth data signal G is the green color data signal, the present inventive concept is not limited thereto. In addition, according to some example embodiments, when the first through fourth data signals B, W, R, and G are applied to the first through fourth pixels 111-1, 111-2, 111-3, and 111-4 via the first through fourth data-lines DL(1), DL(2), DL(3), and DL(4), an initialization operation for the first through fourth data-lines DL(1), DL(2), DL(3), and DL(4) may be performed in order to prevent signal interferences among the first through fourth data signals B, W, R, and G.

Figure 5A:
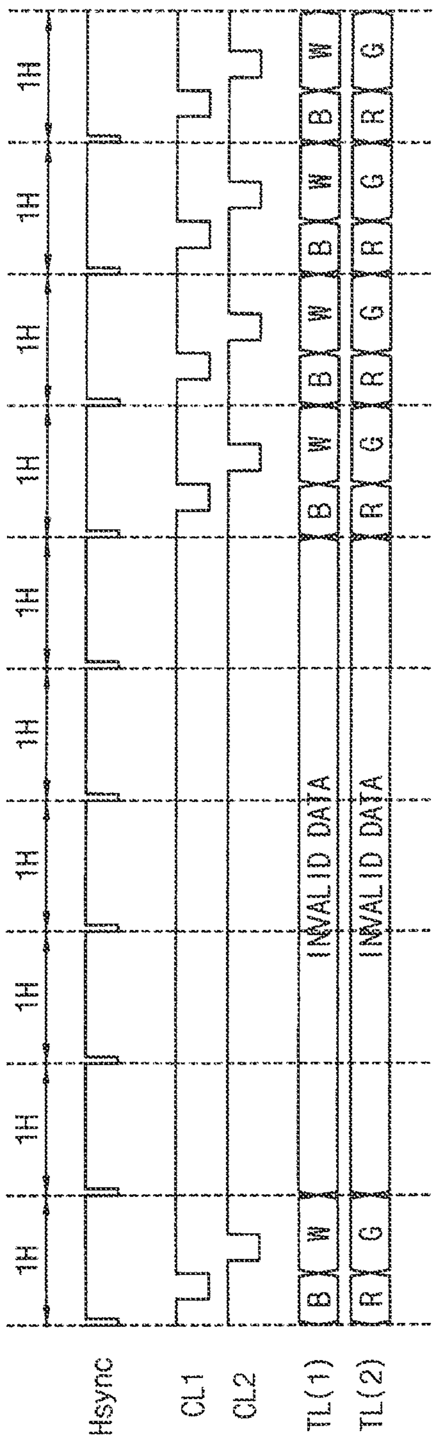
FIGS. 5A and 5B are diagrams illustrating an example in which a sufficient time during which respective source voltages corresponding to respective data signals are changed is secured by an organic light emitting display device of FIG. 1.
Figure 5B:
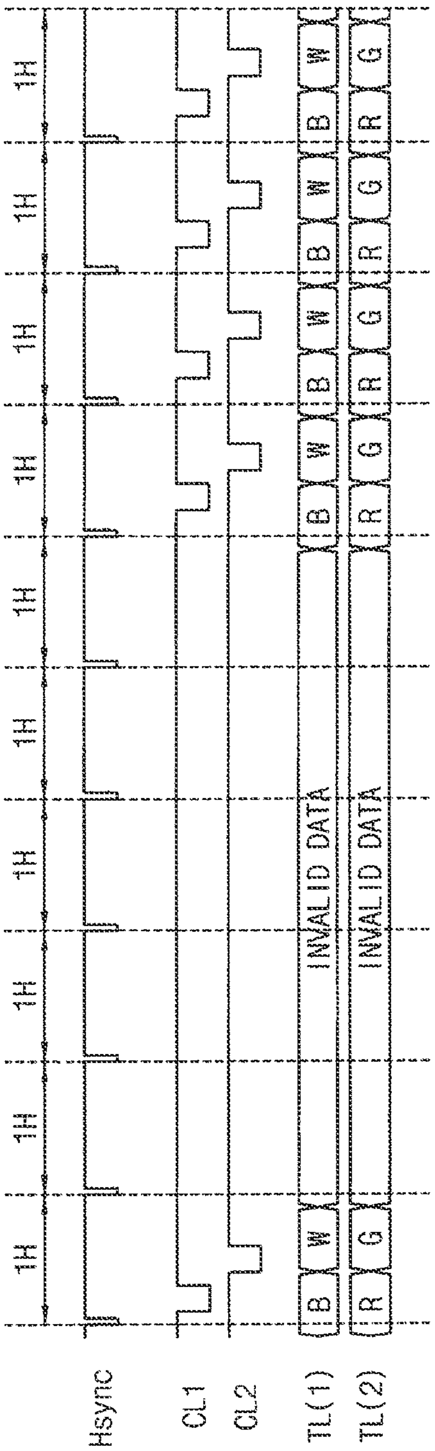

FIGS. 5A and 5B are diagrams illustrating an example in which a sufficient time during which respective source voltages corresponding to respective data signals are changed is secured by an OLED display of FIG. 1.

Referring to FIGS. 5A and 5B, it is illustrated that the OLED display 100 secures a sufficient time during which respective source voltages corresponding to respective data signals (i.e., the first data signal B and the third data signal R) are changed compared to conventional OLED displays (not necessarily prior art). For example, the first data signal B may correspond to the blue color data signal, and the third data signal R may correspond to the red color data signal. Specifically, as illustrated in FIG. 5A, in the conventional OLED displays, the data driving unit alternately outputs the first data signal B for the first pixels 111-1 and the second data signal W for the second pixels 111-2 to the display panel 110, and alternately outputs the third data signal R for the third pixels 111-3 and the fourth data signal G for the fourth pixels 111-4 to the display panel 110. Here, the conventional OLED displays control the data driving unit to begin outputting the first data signal B and the third data signal R after one horizontal period (1H) begins. As a result, the conventional OLED displays may not secure a sufficient time during which respective source voltages corresponding to respective data signals (i.e., the first data signal B and the third data signal R) are changed. In other words, the conventional OLED displays may not display a high-quality image because the source voltage corresponding to the first data signal B and the source voltage corresponding to the third data signal R are insufficiently changed. On the other hand, as illustrated in FIG. 5B, in the OLED display 100, the data driving unit 130 alternately outputs the first data signal B for the first pixels 111-1 and the second data signal W for the second pixels 111-2 to the display panel 110, and alternately outputs the third data signal R for the third pixels 111-3 and the fourth data signal G for the fourth pixels 111-4 to the display panel 110. Here, the OLED display 100 controls the data driving unit 130 to begin outputting the first data signal B and the third data signal R before one horizontal period (1H) begins. As a result, the OLED display 100 may secure a sufficient time during which respective source voltages corresponding to respective data signals (i.e., the first data signal B and the third data signal R) are changed. In other words, the OLED display 100 may display a high-quality image because the source voltage corresponding to the first data signal B and the source voltage corresponding to the third data signal R are sufficiently changed.

Figure 6:
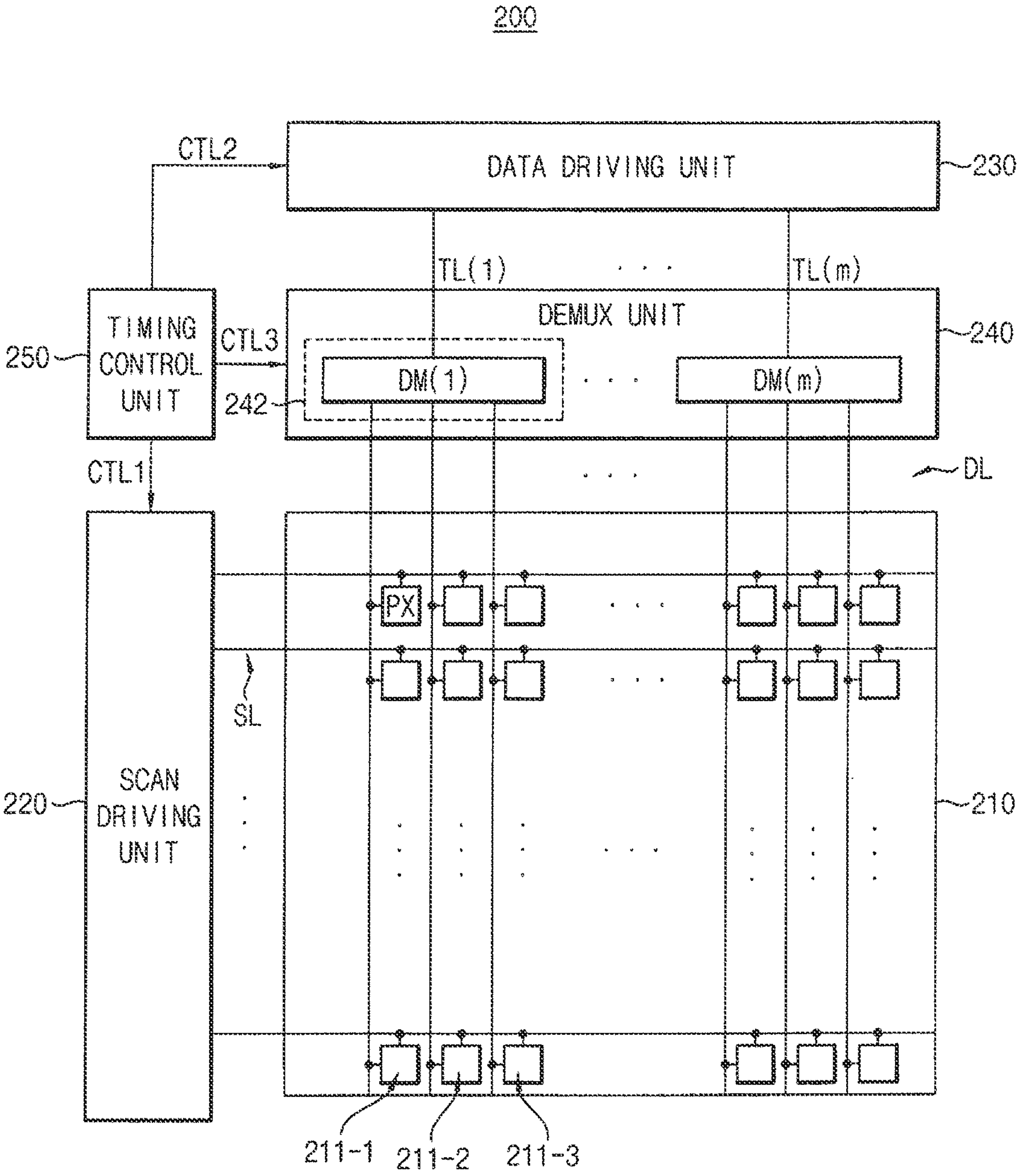
FIG. 6 is a block diagram illustrating an organic light emitting display device according to one exemplary embodiment.
Figure 7:
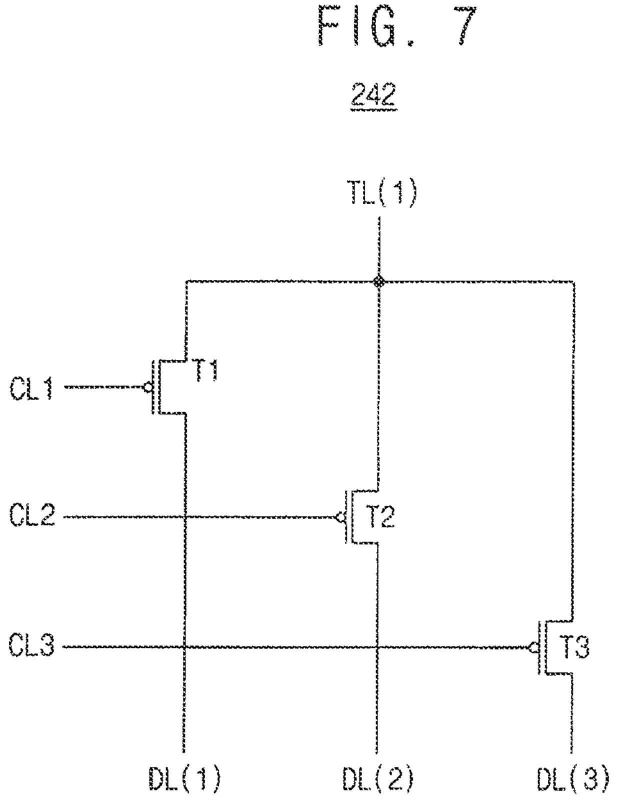
FIG. 7 is a diagram illustrating a demultiplexer included in a demultiplexing unit of an organic light emitting display device of FIG. 6.

FIG. 6 is a block diagram illustrating an OLED display according to one exemplary embodiment. FIG. 7 is a diagram illustrating a demultiplexer included in a demultiplexing unit of an OLED display of FIG. 6.

Referring to FIGS. 6 and 7, the OLED display 200 may include a display panel 210, a scan driving unit 220, a data driving unit 230, a demultiplexing unit 240, and a timing control unit 250.

The display panel 210 may include first pixels 211-1 emitting first color light, second pixels 211-2 emitting second color light, and third pixels 211-3 emitting third color light. The first through third pixels 211-1 through 211-3 may be arranged at locations corresponding to crossing points of scan-lines SL and data-lines DL. Here, each of the first through third pixels 211-1 through 211-3 may be electrically connected to one of the scan-lines SL and one of the data-lines DL, and thus may receive a scan signal transmitted via the scan-lines SL and a data signal transmitted via the data-lines DL. In one example embodiment, the display panel 210 may be manufactured based on an RGB-OLED technology. For example, the first color light may correspond to a red color light (R), the second color light may correspond to a green color light (G), and the third color light may correspond to a blue color light (B). In other words, the first pixels 211-1 may be referred to as red color pixels emitting the red color light, the second pixels 211-2 may be referred to as green color pixels emitting the green color light, and the third pixels 211-3 may be referred to as blue color pixels emitting the blue color light. Similarly, a first data signal that is applied to the first pixels 211-1 may be referred to as a red color data signal, a second data signal that is applied to the second pixels 211-2 may be referred to as a green color data signal, and a third data signal that is applied to the third pixels 211-3 may be referred to as a blue color data signal.

The scan driving unit 220 may sequentially output the scan signal to the display panel 210. For example, when the scan signal is output to a first scan-line SL, the first through third data signals may be applied to the first through third pixels 211-1 through 211-3 connected to the first scan-line SL, respectively. Similarly, when the scan signal is output to a second scan-line SL, the first through third data signals may be applied to the first through third pixels 211-1 through 211-3 connected to the second scan-line SL, respectively. Thus, when the scan driving unit 220 outputs the scan signal to a specific scan-line SL, the first pixels 211-1 connected to the specific scan-line SL may receive the first data signal, the second pixels 211-2 connected to the specific scan-line SL may receive the second data signal, and the third pixels 211-3 connected to the specific scan-line SL may receive the third data signal. The data driving unit 230 may alternately output the first data signal for the first pixels 211-1, the second data signal for the second pixels 211-2, and the third data signal for the third pixels 211-3 to the display panel 210. That is, the first data signal for the first pixels 211-1, the second data signal for the second pixels 211-2, and the third data signal for the third pixels 211-3 may be sequentially output during one horizontal period (1H).

As illustrated in FIG. 6, the OLED display 200 may have a demultiplexing structure. Thus, the demultiplexing unit 240 may be placed between the display panel 210 and the data driving unit 230, where the demultiplexing unit 240 includes a plurality of demultiplexers DM(1) through DM(m). The demultiplexing unit 240 may alternately receive the first data signal, the second data signal, and the third data signal from the data driving unit 230, and may alternately apply the first data signal, the second data signal, and the third data signal to the first pixels 211-1, the second pixels 211-2, and the third pixels 211-3. That is, the first data signal, the second data signal, and the third data signal may be sequentially applied to the first pixels 211-1, the second pixels 211-2, and the third pixels 211-3, respectively during one horizontal period (1H). For example, a first demultiplexer DM(1) may operate as a group 242 of demultiplexers. In this case, as the data driving unit 230 alternately outputs the first data signal, the second data signal, and the third data signal via a first output-line TL(1) (i.e., as the data driving unit 230 sequentially outputs the first data signal, the second data signal, and the third data signal via the first output-line TL(1) during one horizontal period (1H)), the first demultiplexer DM(1) connected to the first output-line TL(1) may alternately apply the first data signal, the second data signal, and the third data signal to the first pixels 211-1, the second pixels 211-2, and the third pixels 211-3.

For this operation, the demultiplexing unit 240 may include a plurality of demultiplexers DM(1) through DM(m), where m is an integer equal to or greater than 2. The demultiplexers DM(1) through DM(m) may apply the first data signal to the first pixels 211-1 while the data driving unit 230 outputs the first data signal, may apply the second data signal to the second pixels 211-2 while the data driving unit 230 outputs the second data signal, and may apply the third data signal to the third pixels 211-3 while the data driving unit 230 outputs the third data signal. In one exemplary embodiment, as illustrated in FIG. 7, each of the demultiplexers DM(1) through DM(m) may include a first switch T1 that controls a coupling between a first data-line DL(1) connected to the first pixels 211-1 and a first output-line TL(1) of the data driving unit 230, a second switch T2 that controls a coupling between a second data-line DL(2) connected to the second pixels 211-2 and the first output-line TL(1) of the data driving unit 230, and a third switch T3 that controls a coupling between a third data-line DL(3) connected to the third pixels 211-3 and the first output-line TL(1) of the data driving unit 230.

The first to third switches T1-T3 may be turned on or turned off based at least in part on first to third demultiplexing control signals CL1-CL3, respectively. Here, the demultiplexing unit 240 may receive the first demultiplexing control signal CL1, the second demultiplexing control signal CL2, and the third demultiplexing control signal CL3 from the timing control unit 250. For example, while the data driving unit 230 outputs the first data signal, the first demultiplexing control signal CL1 may have a logic low level to turn on the first switch T1. Thus, the first data signal may be applied to the first pixels 211-1. In this case, the second and third demultiplexing control signals CL2 and CL3 may have a logic high level to turn off the second switch T2 and the third switch T3. In addition, while the data driving unit 230 outputs the second data signal, the second demultiplexing control signal CL2 may have a logic low level to turn on the second switch T2. Thus, the second data signal may be applied to the second pixels 211-2. In this case, the first and third demultiplexing control signals CL1 and CL3 may have a logic high level to turn off the first switch T1 and the third switch T3. Further, while the data driving unit 230 outputs the third data signal, the third demultiplexing control signal CL3 may have a logic low level to turn on the third switch T3. Thus, the third data signal may be applied to the third pixels 211-3. In this case, the first and second demultiplexing control signals CL1 and CL2 may have a logic high level to turn off the first switch T1 and the second switch T2. As described above, when the first switch T1 is turned on, the second and third switches T2 and T3 may be turned off. Similarly, when the second switch T2 is turned on, the first and third switches T1 and T3 may be turned off. Similarly, when the third switch T3 is turned on, the first and second switches T1 and T2 may be turned off.

Since the OLED display 200 has the demultiplexing structure, the demultiplexing unit 240 may sequentially receive a plurality of data signals (i.e., the first through third data signals) output from the data driving unit 230, and may selectively apply the data signals to the first through third pixels 211-1, 211-2, and 211-3 according to colors of lights emitted by the first through third pixels 211-1, 211-2, and 211-3 during one horizontal period (1H). However, when a quantity of the first through third pixels 211-1, 211-2, and 211-3 increases as a resolution of the OLED display 200 increases, one horizontal period (1H) for the OLED display 200 may decrease because a quantity of the scan-lines SL increases. As a result, a time during which respective source voltages corresponding to respective data signals (i.e., the first through third data signals) sequentially output from the data driving unit 230 during one horizontal time (1H) are changed may not be sufficiently secured. For example, a time during which the source voltage corresponding to the first data signal (e.g., the red color data signal) output from the data driving unit 230 is changed may not be sufficiently secured. Thus, the source voltage corresponding to the first data signal (e.g., the red color data signal) output from the data driving unit 230 may not be sufficiently changed. To overcome this problem, the OLED display 200 may control the data driving unit 230 to begin outputting the first data signal before one horizontal period (1H) begins. As a result, compared to conventional OLED displays that control the data driving unit to begin outputting the first data signal after one horizontal period (1H) begins, the OLED display 200 may secure a sufficient time during which the source voltage corresponding to the first data signal output from the data driving unit 230 is changed.

The timing control unit 250 may control the scan driving unit 220, the data driving unit 230, and the demultiplexing unit 240. As illustrated in FIG. 6, the timing control unit 250 may generate a first control signal CTL1, a second control signal CTL2, and a third control signal CTL3, and may control the scan driving unit 220, the data driving unit 230, and the demultiplexing unit 240 by providing the first control signal CTL1, the second control signal CTL2, and the third control signal CTL3 to the scan driving unit 220, the data driving unit 230, and the demultiplexing unit 240. Specifically, the timing control unit 250 may provide the first control signal CTL1 to the scan driving unit 220. Thus, the scan driving unit 220 may sequentially output the scan signal to the display panel 210. In addition, the timing control unit 250 may provide the second control signal CTL2 to the data driving unit 230. Thus, the data driving unit 230 may alternately output the first data signal for the first pixels 211-1, the second data signal for the second pixels 211-2, and the third data signal for the third pixels 211-3 to the display panel 210. Particularly, the timing control unit 250 may control the data driving unit 230 to begin outputting the first data signal before one horizontal period (1H) begins by providing the second control signal CTL2 to the data driving unit 230. Further, the timing control unit 250 may provide the third control signal CTL3 to the demultiplexing unit 240. Thus, the demultiplexing unit 240 may alternately apply the first data signal, the second data signal, and the third data signal to the first pixels 211-1, the second pixels 211-2, and the third pixels 211-3. To this end, the third control signal CTL3 may include the first demultiplexing control signal CL1, the second demultiplexing control signal CL2, and the third demultiplexing control signal CL3.

The OLED display 200 having the demultiplexing structure may secure a sufficient time during which respective source voltages corresponding to respective data signals are changed by controlling the data driving unit 230 to begin outputting the data signals (e.g., the first data signal) before one horizontal period (1H) begins. On this basis, the OLED display 200 may display a high-quality image. Although it is illustrated in FIG. 7 that the first through third switches T1, T2, and T3 are implemented by PMOS transistors, an implementation of the first through third switches T1, T2, and T3 is not limited thereto. For example, the first through third switches T1, T2, and T3 may be implemented by various transistors such as NMOS transistors, CMOS transistors, etc.

Figure 8:
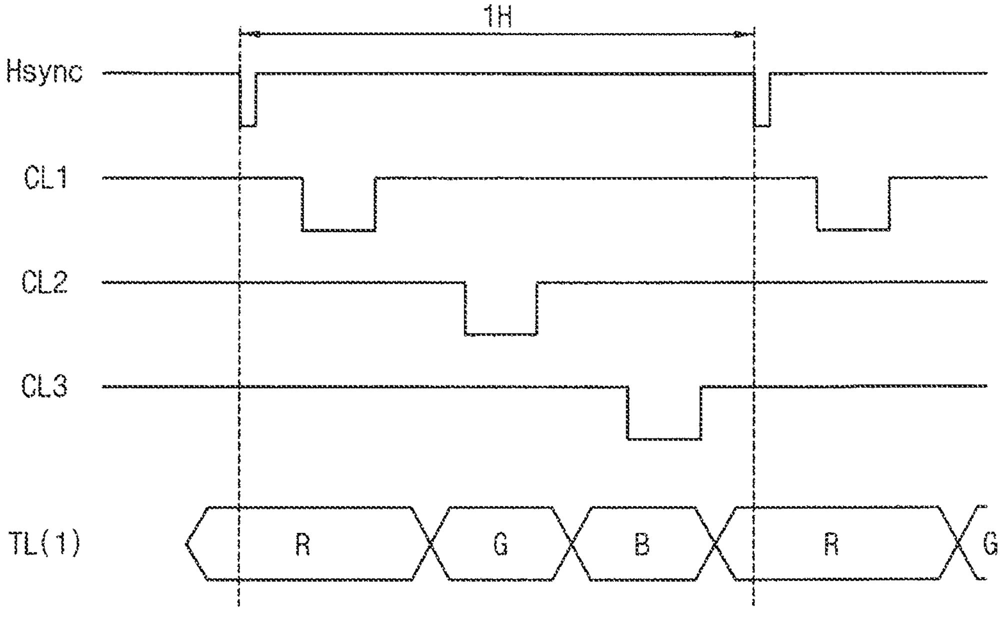
FIG. 8 is a timing diagram illustrating an example in which a data writing operation is performed in an organic light emitting display device of FIG. 6.

FIG. 8 is a timing diagram illustrating an example in which a data writing operation is performed in an OLED display of FIG. 6.

Referring to FIG. 8, one horizontal period (1H) for the OLED display 200 may be defined based on a horizontal synchronization signal Hsync. For convenience of descriptions, as described with reference to FIG. 7, a data writing operation will be described focused on a group 242 of demultiplexers including the first demultiplexer DM(1).

The data driving unit 230 may alternately output the first data signal R (e.g., the red color data signal), the second data signal G (e.g., the green color data signal), and the third data signal B (e.g., the blue color data signal) via the first output-line TL(1). As illustrated in FIG. 8, during one horizontal period (1H), the data driving unit 230 may sequentially provide the first data signal R, the second data signal G, and the third data signal B to the demultiplexing unit 240 via the first output-line TL(1). Thus, while the data driving unit 230 outputs the first data signal R, the demultiplexing unit 240 may apply the first data signal R to the first pixels 211-1 via the first data-line DL(1) when the first demultiplexing control signal CL1 is changed from a logic high level to a logic low level. In addition, while the data driving unit 230 outputs the second data signal G, the demultiplexing unit 240 may apply the second data signal G to the second pixels 211-2 via the second data-line DL(2) when the second demultiplexing control signal CL2 is changed from a logic high level to a logic low level. Further, while the data driving unit 230 outputs the third data signal B, the demultiplexing unit 240 may apply the third data signal B to the third pixels 211-3 via the third data-line DL(3) when the third demultiplexing control signal CL3 is changed from a logic high level to a logic low level.

When the data writing operation is performed in the OLED display 200, as illustrated in FIG. 8, the OLED display 200 may control the data driving unit 230 to begin outputting the first data signal R before one horizontal period (1H) begins in order to secure a sufficient time during which a source voltage corresponding to the first data signal R output from the data driving unit 230 is changed. Thus, the data driving unit 230 may begin outputting the first data signal R before the horizontal synchronization signal Hsync is applied. As a result, compared to conventional OLED displays (not necessarily prior art) that control the data driving unit to begin outputting the first data signal R after one horizontal period (1H) begins, the OLED display 200 may secure a sufficient time during which the source voltage corresponding to the first data signal R is changed. Although it is described above that the first data signal R is the red color data signal, the second data signal G is the green color data signal, and the third data signal B is the blue color data signal, the present inventive concept is not limited thereto. In addition, according to some exemplary embodiments, when the first through third data signals R, G, and B are applied to the first through third pixels 211-1, 211-2, and 211-3 via the first through third data-lines DL(1), DL(2), and DL(3), an initialization operation for the first through third data-lines DL(1), DL(2), and DL(3) may be performed in order to prevent signal interferences among the first through third data signals R, G, and B.

Figure 9:
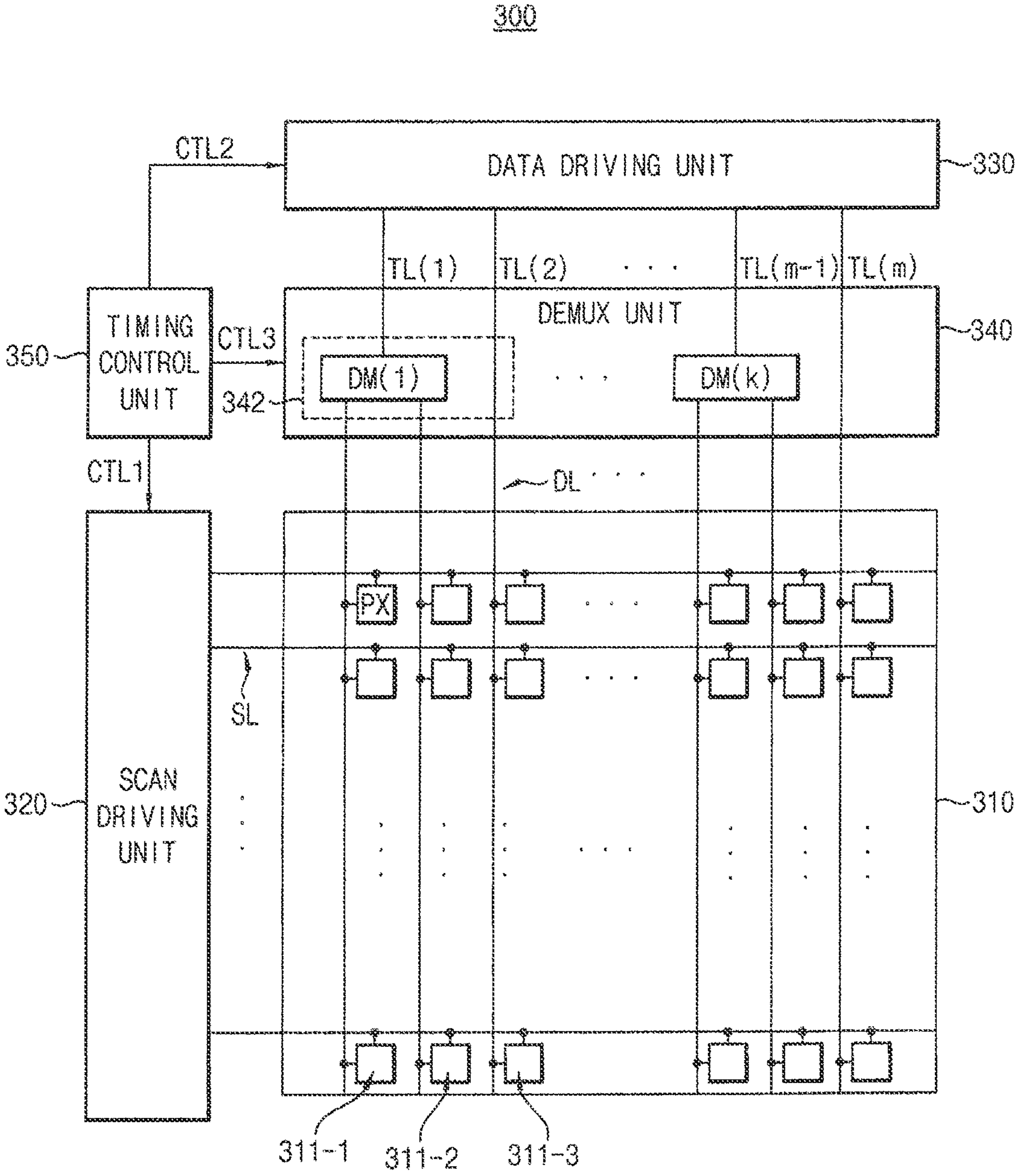
FIG. 9 is a block diagram illustrating an organic light emitting display device according to one exemplary embodiment.
Figure 10:
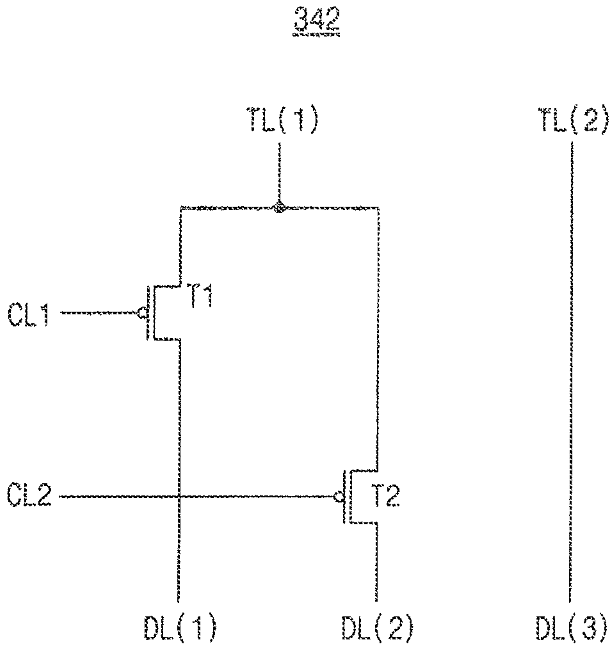
FIG. 10 is a diagram illustrating a demultiplexer included in a demultiplexing unit of an organic light emitting display device of FIG. 9.
Figure 11:
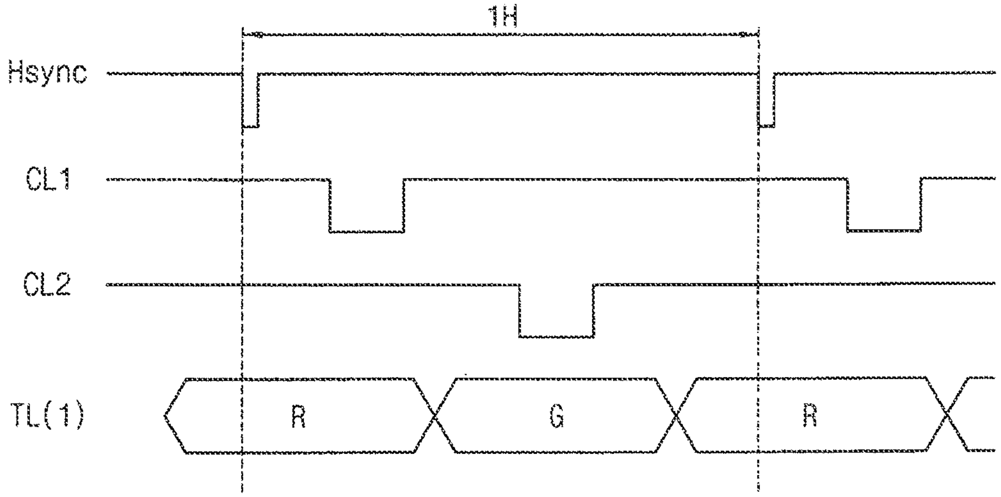
FIG. 11 is a timing diagram illustrating an example in which a data writing operation is performed in an organic light emitting display device of FIG. 9.

FIG. 9 is a block diagram illustrating an OLED display according to one exemplary embodiment. FIG. 10 is a diagram illustrating a demultiplexer included in a demultiplexing unit of an OLED display of FIG. 9. FIG. 11 is a timing diagram illustrating an example in which a data writing operation is performed in an OLED display of FIG. 9.

Referring to FIGS. 9 through 11, the OLED display 300 may include a display panel 310, a scan driving unit 320, a data driving unit 330, a demultiplexing unit 340, and a timing control unit 350.

The display panel 310 may include first pixels 311-1 emitting first color light, second pixels 311-2 emitting second color light, and third pixels 311-3 emitting third color light. The first through third pixels 311-1 through 311-3 may be arranged at locations corresponding to crossing points of scan-lines SL and data-lines DL. Here, each of the first through third pixels 311-1 through 311-3 may be connected to one of the scan-lines SL and one of the data-lines DL, and thus may receive a scan signal transmitted via the scan-lines SL and a data signal transmitted via the data-lines DL. In one example embodiment, the display panel 310 may be manufactured based on an RGB-OLED technology. For example, the first color light may correspond to a red color light (R), the second color light may correspond to a green color light (G), and the third color light may correspond to a blue color light (B). In other words, the first pixels 311-1 may be referred to as red color pixels emitting the red color light, the second pixels 311-2 may be referred to as green color pixels emitting the green color light, and the third pixels 311-3 may be referred to as blue color pixels emitting the blue color light. Similarly, a first data signal that is applied to the first pixels 311-1 may be referred to as a red color data signal, a second data signal that is applied to the second pixels 311-2 may be referred to as a green color data signal, and a third data signal that is applied to the third pixels 311-3 may be referred to as a blue color data signal.

The scan driving unit 320 may sequentially output the scan signal to the display panel 310. For example, when the scan signal is output to a first scan-line SL, the first through third data signals R, G, and B may be applied to the first through third pixels 311-1 through 311-3 connected to the first scan-line SL, respectively. Similarly, when the scan signal is output to a second scan-line SL, the first through third data signals R, G, and B may be applied to the first through third pixels 311-1 through 311-3 connected to the second scan-line SL, respectively. Thus, when the scan driving unit 320 outputs the scan signal to a specific scan-line SL, the first pixels 311-1 connected to the specific scan-line SL may receive the first data signal R, the second pixels 311-2 connected to the specific scan-line SL may receive the second data signal G, and the third pixels 311-3 connected to the specific scan-line SL may receive the third data signal B. The data driving unit 330 may alternately output the first data signal R for the first pixels 311-1 and the second data signal G for the second pixels 311-2. That is, the first data signal R for the first pixels 311-1 and the second data signal G for the second pixels 311-2 may be sequentially output during one horizontal period (1H). In addition, the data driving unit 330 may output the third data signal B for the third pixels 311-3 to the display panel 310.

As illustrated in FIG. 9, the OLED display 300 may have a demultiplexing structure. Thus, the demultiplexing unit 340 may be placed between the display panel 310 and the data driving unit 330, where the demultiplexing unit 340 includes a plurality of demultiplexers DM(1) through DM(k). The demultiplexing unit 340 may alternately receive the first data signal R and the second data signal G from the data driving unit 330, and may alternately apply the first data signal R and the second data signal G to the first pixels 311-1 and the second pixels 311-2. That is, the first data signal R and the second data signal G may be sequentially applied to the first pixels 311-1 and the second pixels 311-2, respectively during one horizontal period (1H). On the other hand, the third data signal B for the third pixels 311-3 may be directly applied to the third pixels 311-3 by the data driving unit 330. For example, a first demultiplexer DM(1) may operate as a group 342 of demultiplexers. In this case, as the data driving unit 330 alternately outputs the first data signal R and the second data signal G via a first output-line TL(1) (i.e., as the data driving unit 330 sequentially outputs the first data signal R and the second data signal G via the first output-line TL(1) during one horizontal period (1H)), the first demultiplexer DM(1) connected to the first output-line TL(1) may alternately apply the first data signal R and the second data signal G to the first pixels 311-1 and the second pixels 311-2. On the other hand, as illustrated in FIG. 9, the data driving unit 330 may directly apply the third data signal B to the third pixels 311-3 via a second output-line TL(2).

For this operation, the demultiplexing unit 340 may include a plurality of demultiplexers DM(1) through DM(k), where k is an integer equal to or greater than 1. The demultiplexers DM(1) through DM(k) may apply the first data signal R to the first pixels 311-1 while the data driving unit 330 outputs the first data signal R, and may apply the second data signal G to the second pixels 311-2 while the data driving unit 330 outputs the second data signal G. In one example embodiment, as illustrated in FIG. 10, each of the demultiplexers DM(1) through DM(k) may include a first switch T1 that controls a coupling between a first data-line DL(1) connected to the first pixels 311-1 and a first output-line TL(1) of the data driving unit 330, and a second switch T2 that controls a coupling between a second data-line DL(2) connected to the second pixels 311-2 and the first output-line TL(1) of the data driving unit 330. Meanwhile, since a third data-line DL(3) connected to the third pixels 311-3 is directly connected to the second output-line TL(2) of the data driving unit 330, the data driving unit 330 may directly apply the third data signal B to the third pixels 311-3 (i.e., not via the demultiplexers DM(1) through DM(k)).

The first and second switches T1 and T2 may be turned on or turned off based at least in part on first and second demultiplexing control signals CL1 and CL2, respectively. Here, the demultiplexing unit 340 may receive the first demultiplexing control signal CL1 and the second demultiplexing control signal CL2 from the timing control unit 350. For example, while the data driving unit 330 outputs the first data signal R, the first demultiplexing control signal CL1 may have a logic low level to turn on the first switch T1. Thus, the first data signal R may be applied to the first pixels 311-1. In this case, the second demultiplexing control signals CL2 may have a logic high level to turn off the second switch T2. In addition, while the data driving unit 330 outputs the second data signal G, the second demultiplexing control signal CL2 may have a logic low level to turn on the second switch T2. Thus, the second data signal R may be applied to the second pixels 311-2. In this case, the first demultiplexing control signals CL1 may have a logic high level to turn off the first switch T1. As described above, when the first switch T1 is turned on, the second switch T2 may be turned off. Similarly, when the second switch T2 is turned on, the first switch T1 may be turned off. In some exemplary embodiments, the data driving unit 330 may substantially simultaneously output the third data signal B with the first data signal R or the second data signal G.

Since the OLED display 300 has the demultiplexing structure, the demultiplexing unit 340 may sequentially receive a plurality of data signals (i.e., the first data signal R and the third data signal G) output from the data driving unit 330, and may selectively apply the first data signal R and the second data signal G to the first pixels 311-1 and the second pixels 311-2 according to colors of lights emitted by the first pixels 311-1 and the second pixels 311-2 during one horizontal period (1H). However, when a quantity of the first through third pixels 311-1, 311-2, and 311-3 increases as a resolution of the OLED display 300 increases, one horizontal period (1H) for the OLED display 300 may decrease because a quantity of the scan-lines SL increases. As a result, a time during which respective source voltages corresponding to respective data signals (i.e., the first data signal R and the second data signal G) sequentially output from the data driving unit 330 during one horizontal time (1H) are changed may not be sufficiently secured. For example, a time during which the source voltage corresponding to the first data signal R output from the data driving unit 330 is changed may not be sufficiently secured. Thus, the source voltage corresponding to the first data signal R output from the data driving unit 330 may not be sufficiently changed. To overcome this problem, as illustrated in FIG. 11, the OLED display 300 may control the data driving unit 330 to begin outputting the first data signal R before one horizontal period (1H) begins. As a result, compared to conventional OLED displays (not necessarily prior art) that control the data driving unit to begin outputting the first data signal R after one horizontal period (1H) begins, the OLED display 300 may secure a sufficient time during which the source voltage corresponding to the first data signal R output from the data driving unit 330 is changed.

The timing control unit 350 may control the scan driving unit 320, the data driving unit 330, and the demultiplexing unit 340. As illustrated in FIG. 9, the timing control unit 350 may generate a first control signal CTL1, a second control signal CTL2, and a third control signal CTL3, and may control the scan driving unit 320, the data driving unit 330, and the demultiplexing unit 340 by providing the first control signal CTL1, the second control signal CTL2, and the third control signal CTL3 to the scan driving unit 320, the data driving unit 330, and the demultiplexing unit 340. Specifically, the timing control unit 350 may provide the first control signal CTL1 to the scan driving unit 320. Thus, the scan driving unit 320 may sequentially output the scan signal to the display panel 310. In addition, the timing control unit 350 may provide the second control signal CTL2 to the data driving unit 330. Thus, the data driving unit 330 may alternately output the first data signal R for the first pixels 311-1 and the second data signal G for the second pixels 311-2 to the display panel 310, and may output the third data signal B for the third pixels 311-3 to the display panel 310. Particularly, the timing control unit 350 may control the data driving unit 330 to begin outputting the first data signal R before one horizontal period (1H) begins by providing the second control signal CTL2 to the data driving unit 330. Further, the timing control unit 350 may provide the third control signal CTL3 to the demultiplexing unit 340. Thus, the demultiplexing unit 340 may alternately apply the first data signal R and the second data signal G to the first pixels 311-1 and the second pixels 311-2. To this end, the third control signal CTL3 may include the first demultiplexing control signal CL1 and the second demultiplexing control signal CL2.

The OLED display 300 having the demultiplexing structure may secure a sufficient time during which respective source voltages corresponding to respective data signals are changed by controlling the data driving unit 330 to begin outputting the data signals (e.g., the first data signal R) before one horizontal period (1H) begins. On this basis, the OLED display 300 may display a high-quality image. Although it is illustrated in FIG. 10 that the first and second switches T1 and T2 are implemented by PMOS transistors, an implementation of the first and second switches T1 and T2 is not limited thereto. For example, the first and second switches T1 and T2 may be implemented by various transistors such as NMOS transistors, CMOS transistors, etc. In addition, although it is described above that the first data signal R is the red color data signal, the second data signal G is the green color data signal, and the third data signal B is the blue color data signal, the present inventive concept is not limited thereto. Further, according to some example embodiments, when the first and second data signals R and G are applied to the first and second pixels 311-1 and 311-2 via the first and second data-lines DL(1) and DL(2), an initialization operation for the first and second data-lines DL(1) and DL(2) may be performed in order to prevent signal interferences between the first and second data signals R and G.

Figure 12:
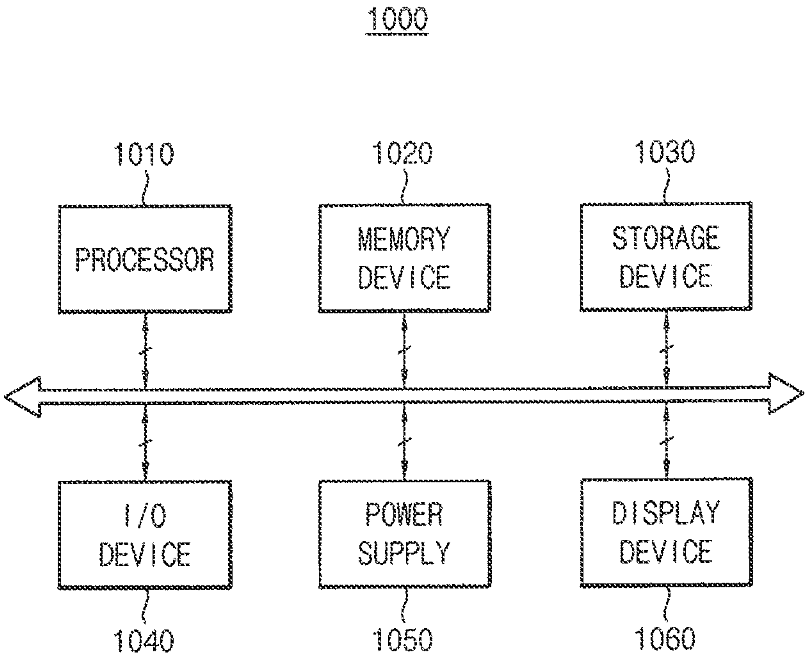
FIG. 12 is a block diagram illustrating an electronic device having an organic light emitting display device according to one exemplary embodiment.

FIG. 12 is a block diagram illustrating an electronic device having an OLED display according to one exemplary embodiment.

Referring to FIG. 12, the electronic device 1000 may include a processor 1010, a memory device 1020, a storage device 1030, an input/output (I/O) device 1040, a power supply 1050, and an OLED display 1060. Here, the OLED display 1060 may correspond to the OLED display 100 of FIG. 1, the OLED display 200 of FIG. 6, or the OLED display 300 of FIG. 9. In addition, the electronic device 1000 may further include a plurality of ports for communicating a video card, a sound card, a memory card, a universal serial bus (USB) device, other electronic devices, etc.

The processor 1010 may perform various computing functions. The processor 1010 may be a micro-processor, a central processing unit (CPU), etc. The processor 1010 may be connected to other components via an address bus, a control bus, a data bus, etc. In some exemplary embodiments, the processor 1010 may be connected to an extended bus such as a peripheral component interconnection (PCI) bus. The memory device 1020 may store data for operations of the electronic device 1000. For example, the memory device 1020 may include a volatile semiconductor memory device such as a dynamic random access memory (DRAM) device, a static random access memory (SRAM) device, a mobile DRAM device, etc., and/or a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In some example embodiments, the storage device 1030 may correspond to an SSD device, an HDD device, a CD-ROM device, etc. The storage device 1030 may include a solid state drive (SSD), a hard disk drive (HDD), a CD-ROM, etc.

The I/O device 1040 may include an input device such as a keyboard, a keypad, a touch-pad, a touch-screen, a mouse, etc., and an output device such as a speaker, a printer, etc. In some exemplary embodiments, the OLED display 1060 may be included in the I/O device 1040. The power supply 1050 may provide a power for operations of the electronic device 1000. The OLED display 1060 may be connected to other components via the buses or other communication links. As described above, the OLED display 1060 may have a demultiplexing structure. Specifically, the OLED display 1060 may include a display panel, a scan driving unit, a data driving unit, a demultiplexing unit, and a timing control unit. Here, the OLED display 1060 may secure a sufficient time during which respective source voltages corresponding to respective data signals output from the data driving unit are changed by controlling the data driving unit to begin outputting the data signals before one horizontal period (1H) begins. As a result, the OLED display 1060 may display a high-quality image. In one example embodiment, the display panel of the OLED display 1060 may be manufactured based on a WRGB-OLED technology. In this case, the display panel of the OLED display 1060 may include red pixels, green pixels, blue pixels, and white pixels. In another example embodiment, the display panel of the OLED display 1060 may be manufactured based on an RGB-OLED technology. In this case, the display panel of the OLED display 1060 may include red pixels, green pixels, and blue pixels.

The present inventive concept may be applied to an OLED display having a demultiplexing structure, and an electronic device having the OLED display. For example, the present inventive concept may be applied to a computer monitor, a television, a laptop, a digital camera, a cellular phone, a smart-phone, a smart-pad, a personal digital assistants (PDA), a portable multimedia player (PMP), an MP3 player, a navigation system, a video-phone, etc.

The foregoing is illustrative of exemplary embodiments and is not to be construed as limiting thereof. Although a few exemplary embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An organic light emitting diode (OLED) display comprising:

a display panel comprising a plurality of first pixels configured to emit a first color light, a plurality of second pixels configured to emit a second color light, and a plurality of third pixels configured to emit a third color light, the first through third pixels being arranged at locations corresponding to crossing points of a plurality of scan-lines and a plurality of data-lines;

a scan driver configured to sequentially output a scan signal to the display panel;

a data driver configured to alternately output a first data signal to be applied to the first pixels to emit the first color light corresponding to one horizontal period and a second data signal to be applied to the second pixels to emit the second color light corresponding to the one horizontal period to the display panel, configured to output a third data signal to be applied to the third pixels to emit the third color light corresponding to the one horizontal period to the display panel, and configured to begin outputting the first data signal at a first point of time in a period immediately preceding the one horizontal period and end outputting the first data signal at a second point of time in the one horizontal period;

a demultiplexing unit configured to alternately apply the first and second data signals to the first and second pixels, respectively, the demultiplexing unit being placed between the display panel and the data driver; and a timing controller configured to control the scan driver, the data driver, and the demultiplexing unit, wherein the data driver is configured to directly apply the third data signal to the third pixels, and wherein the first to third data signals are effective data signals that are applied to the first to third pixels, respectively, during the one horizontal period.

2. The OLED display of claim 1, wherein the display panel is configured to be manufactured based on an RGB-OLED technology.

3. The OLED display of claim 2, wherein each of the first to third color lights is one of the following: a blue color light, a red color light, and a green color light.

4. The OLED display of claim 1, wherein the demultiplexing unit includes:

a plurality of demultiplexers configured to apply the first data signal to the first pixels while the data driver outputs the first data signal, and configured to apply the second data signal to the second pixels while the data driver outputs the second data signal.

5. The OLED display of claim 4, wherein each of the demultiplexers includes:

a first switch configured to control a coupling between a first data-line electrically connected to the first pixels and an output-line of the data driver; and a second switch configured to control a coupling between a second data-line electrically connected to the second pixels and the output-line of the data driver.

6. The OLED display of claim 5, wherein the second switch is configured to be turned off when the first switch is turned on, and the first switch is configured to be turned off when the second switch is turned on.

7. The OLED display of claim 1, wherein a third data-line electrically connected to the third pixels is coupled to an output-line of the data driver.

8. The OLED display of claim 7, wherein the data driver is configured to simultaneously output the first data signal and the third data signal.

9. The OLED display of claim 8, wherein the data driver is configured to begin outputting the third data signal at the first point of time in the period immediately preceding the one horizontal period and end outputting the third data signal at the second point of time in the one horizontal period.

10. The OLED display of claim 7, wherein the data driver is configured to simultaneously output the second data signal and the third data signal.

* * * * *